2,158,077

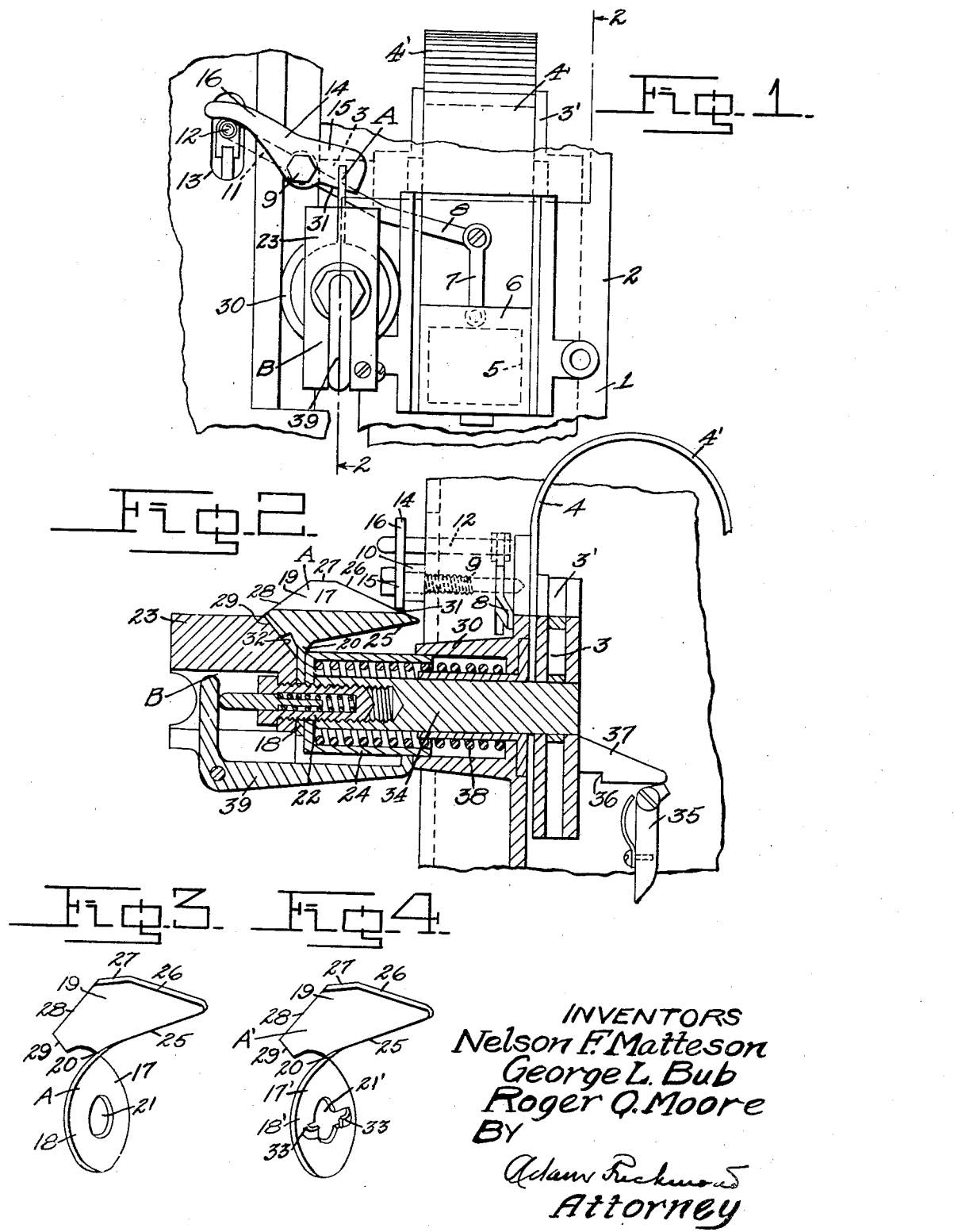
May 16, 1939.  N. F. MATTESON ET AL  2,158,077
FRAMING LIGHT SHUTTER LIFTER
Filed Nov. 27, 1937
INVENTORS
Nelson F. Matteson
George L. Bub
Roger Q. Moore
BY
Adam Richmond
Attorney Patented May 16, 1939

UNITED STATES PATENT OFFICE 2,158,077

FRAMING LIGHT SHUTTER LIFTER

Nelson Floyde Matteson, Washington, D. C., and George Louis Bub and Roger Q. Moore, St. Louis, Mo.

Application November 27, 1937, Serial No. 176,812

8 Claims. (Cl. 88—17)

(Granted under the act of March 3, 1883, as amended April 30, 1928; 370 O. G. 757)

This invention described herein may be manufactured and used by or for the Government for governmental purposes, without the payment to us of any royalty thereon.

This invention relates to an improved apparatus for use in projectors of motion pictures; more particularly it is directed to a device for automatically opening the conventional fire shutter of motion picture projectors simultaneously with the opening of the film trap or gate thereof.

The principal object of the invention is to provide means on a motion picture projector whereby the conventional fire shutter is automatically opened by the same operation required to open the film trap of the projector, also to hold the fire shutter open during the time required to place the film in the film trap of the projector and to permit the fire shutter to assume the desired closed position when the film trap is closed.

Another object of the invention is to provide a device for automatically opening the fire shutter of a motion picture projector simultaneously with the opening of the film trap, which is simple in construction, convenient of adjustment to existing equipment and dependable in operation.

In the conventional procedure on the standard types of motion picture projectors the left hand of the operator during the threading of the film on the projector, is necessarily in an extremely awkward position with one or more fingers of the left hand being used to open and hold in open position the conventional fire shutter in order that light from a framing lamp may reach the film during the interval of time required to place the film in proper position in the film trap of the projector, while at the same time the thumb of the left hand is used to form the desired loop in the film just above the film trap. To do this rapidly and efficiently requires practice and with the use of the high intensity lamps frequently results in painfully burned fingers and improperly formed film loops.

It is therefore the aim and purpose of this invention to provide means whereby the conventional fire shutter of motion picture projectors is opened automatically and simultaneously with the opening of the film trap of the projector thereby permitting the fingers of the operator to be used for forming the film loop more properly and eliminating the possibility of burning the fingers.

With the above and other objects and advantages in view the invention consists in certain features of construction and operation of parts which will hereinafter appear and in which—

Fig. 1 is a fragmentary rear elevation of a motion picture projector having the invention applied thereto;

Fig. 2 is a vertical sectional view taken on the line 2—2 of Fig. 1;

Fig. 3 is a perspective view of one form of the invention, and

Fig. 4 is a perspective view of a modified form of the invention.

In the illustrated embodiment characterizing the invention 1 indicates a portion of a standard motion picture projecting machine having a plate 2 provided thereon which supports a film trap mount or carrier 3 having a conventional film gate or trap 3' secured thereto. The film gate or trap 3' guides and maintains the film 4 containing a loop 4' in a flattened condition while it moves rapidly past a projection aperture 5 provided in the plate 2. The passage of light through projection aperture 5 is controlled by a fire shutter 6 of usual construction which is operated by a linkage mechanism including an upwardly extending arm 7, pivotally connected with one end of an actuating arm 8, that is rotatably mounted on the frame of the machine by means of a threaded bolt 9, having a collar 10 provided thereon which is preferably fitted over the inner end of the threaded portion of the bolt. The other end 11 of the arm 8 is provided with a fire shutter operating arm or pin 12 which is adapted to move in a slot 13 formed in the frame of the projector.

It will be noted that when the pin 12 is pushed downwardly the fire shutter 6 is raised to open the aperture 5 to a beam of light coming from the projection lamp (not shown). This pin 12 is automatically operated in a well known manner when the machine is running to hold the shutter in raised position.

In order to automatically move the pin 12 downwardly and raise the fire shutter 6 automatically and simultaneously with the opening of the film trap or gate 3', a lever 14 is provided which is asymmetrically pivoted to the frame of the projector by the bolt 9 whereby a short and long end 15 and 16 respectively is provided on the lever. The long end 16 of the lever is adapted to contact with the upper periphery of the pin 12 and the short end 15 thereof is adapted to be actuated by the improved device A to which this invention is directed, for causing the lever 14 to move about the bolt 9 and force the long end 16 thereof against the pin 12 to move it in a downward direction and thus raise the fire shutter.

The improved device A is mounted on a conventional film gate actuating mechanism indicated generally by B and comprises a sheet metal cam 17 having two relatively large portions or areas 18 and 19 connected by a small neck portion 20 which is twisted in such a manner as to cause the planes of the larger portions 18 and 19 to lie at substantially right angles with each other. The portion 18 of the cam is substantially disk-shaped with an opening 21 in the approximate center thereof, as illustrated in Fig. 3, for use in mounting the device A on a screw 22 provided on the gate actuating mechanism B, the said device A being mounted on the screw 22 between the inner face of a film trap lock casing 23 of the gate actuating mechanism and the closed outer end of a thimble 24 thereof. The other large portion 19 of the device is of an irregular contour, as shown, having a plurality of sides 25, 26, 27, 28 and 29. The side 25 is disposed at an obtuse angle to the disk-shaped portion 18 of the cam to properly clear an extended boss 30 provided on the plate 2. The side 26 of the device is disposed at an acute angle to the side 25 and provides a cam surface which is adapted to coact with the lower side edge 31 of the short end 15 of lever 14. The side 27 is disposed substantially at a right angle to the disk-shaped portion 19 of the cam. The side 28 is disposed at an obtuse angle to the side 27 and the side 29 is disposed substantially at a right angle with the side 28 and at an acute angle to the side 26. The side 29 provides an abutting portion which is adapted to rest against the inclined inner surface 32 of the film trap lock casting 23 for preventing any bending of the neck portion 20 of the device A, as a result of any unusual thrust which may possibly be caused by the sticking of the lever 14 and the linkage mechanism connecting the fire shutter 6 to the pin 12.

In Fig. 4 is illustrated a modified form of device A'. In this modified form the disk-shaped portion 18' of the sheet metal cam 17' is provided with an opening 21' for surrounding the mounting screw 22 of the gate actuating mechanism on which it is adapted to be mounted. From the opposite sides of the opening 21' are struck-up ear members 33 which are bent for engagement within grooves (not shown), which may be provided in the inner side of the film trap lock casting 23 or in the outer side of the thimble 24 of the gate actuating mechanism whereby the cam is prevented from moving around on the mounting screw 22. Corresponding notches may be provided in the outer end of a cylindrical shaft 34 for the film trap mount or carrier 3.

In operation, assuming that the motion picture projector has been stopped and that the gate actuating mechanism B including the film trap mount or carrier 3 is moved inwardly to open up the film gate 3' for threading purposes, the device A is carried with the actuating mechanism in a horizontal direction whereby the outer end of the side 36 of the device contacts with the lower side edge 31 of the short end 15 of the lever 14 which upon continual movement inwardly of the film gate actuating mechanism, causes the short end 15 of the lever to ride up on the side 26 of the cam, thus causing the lever to rotate about its pivoted connection with the bolt 9 in a counter-clockwise direction, forcing the long end 16 of the lever downwardly against the pin 12 which is in turn caused to move in a downward direction, thus opening the fire shutter 6 through the action of the linkage arms 7 and 8, the fire shutter 6 at this movement acting as a framing light shutter. The film gate or trap 3' is locked in open position by means of a spring actuated catch 35 which is adapted to engage a notch 36 provided on a projection 37 of the film trap mount 3. Upon releasing the catch 35 the film gate actuating mechanism is caused to move back to its normal operative position under the action of a coil spring 38 and locked in place by a pivot lever 39, one end of which is adapted to engage the outer side edge of the boss 30, thus closing the film gate 3' against the film and permitting the pin 12 to move upwardly to close the fire shutter 6 over the projecting aperture 5.

It will thus be seen that there is provided a highly novel and useful form of device which is well adapted for all the purposes indicated, even though the device herein disclosed is shown as comprising certain features of construction and operation of parts, it is nevertheless to be understood that various changes may be made therein without departing from the spirit or scope of the invention.

Having described our invention, what we claim as new and wish to secure by Letters Patent is—

1. In combination with a projector of the type described having a fire shutter and a film gate provided thereon, a mechanism for actuating said film gate, linkage means for operating said fire shutter, a lever pivotably mounted on said projector for actuating said linkage means and means mounted on said mechanism for actuating said lever, said last mentioned means comprising a cam including a portion for attachment to said mechanism and a portion at right angles thereto contacting with said lever.

2. In combination with a projector of the type described having a fire shutter and a film gate provided thereon, a mechanism for actuating said film gate, linkage means including a pin for operating said fire shutter, a lever asymmetrically pivoted to said projector for actuating said linkage means through said pin, and a cam mounted on said mechanism for actuating said lever, said cam comprising a portion for attachment to said mechanism and an irregular shaped portion at right angles thereto, said irregular shaped portion including a cam surface portion contacting with said lever.

3. In combination with a projector of the type described having a fire shutter and a film gate provided thereon, a mechanism including a film trap lock for actuating said film gate and locking it in an operative position, linkage means including a pin for operating said fire shutter, a lever pivoted to said projector, a long and short end portion pivoted on said lever, the long end portion of said lever adapted to contact with said pin, a cam mounted on said mechanism for actuating said lever, said cam including a portion for attachment to said mechanism and an irregular shaped portion at right angles thereto, said irregular shaped portion including a film trap lock abutting portion and an inclined cam surface portion adapted to contact with said short end portion of said lever for actuating said lever about its pivot upon the actuation of said mechanism, whereby the said long end portion of said lever is actuated against said pin and said linkage means is actuated to operate said fire shutter.

4. A fire shutter actuating device for motion picture projectors comprising a unitary structure of sheet metal bent by a quarter-twist to form an attaching portion and a portion at right angles thereto, said attaching portion being disk-shaped and having a central aperture therein, an integral ear member on opposite sides of said aperture, said second mentioned portion having an irregular contour including a side at an obtuse angle to said attaching portion, a side at an acute angle to said first mentioned side, and a side at an acute angle to said last mentioned side, said second mentioned side providing an inclined cam surface and said third mentioned side providing an abutting surface.

5. A fire shutter actuating device for motion picture projectors comprising a plane surface attaching portion and an irregular-shaped plane surface portion at right angles thereto, said irregular-shaped plane surface portion including a rearwardly and upwardly inclined camming surface.

6. A fire shutter actuating device for motion picture projectors comprising a unitary structure of sheet metal bent by a quarter-twist to form a plane surface attaching portion and a plane surface portion at right angles thereto, said attaching portion being disk-shaped and having an aperture therein, and said second mentioned portion having an irregular contour including a rearwardly and upwardly inclined camming surface and an abutting surface.

7. A fire shutter actuating attachment for motion picture projectors adapted to be carried by and rectilinearly movable with a rectilinearly movable film gate support of the projector, said attachment including a rearwardly and upwardly inclined camming surface adapted to engage a complemental camming surface associated with an elevating mechanism of a fire shutter, whereby rectilinear movement of the film gate support simultaneously opens the fire shutter.

8. A fire shutter actuating attachment for motion picture projectors adapted to be carried by and rectilinearly movable with a rectilinearly movable film gate support of the projector, said attachment including a rearwardly and upwardly inclined camming surface adapted to engage a complemental camming surface associated with an elevating mechanism of a fire shutter and an abutting surface adapted to bear against a film trap lock associated with said film gate support, whereby rectilinear movement of the film gate support simultaneously operates the fire shutter, and the attachment is held in a rigid position thereon.

NELSON FLOYDE MATTESON.
GEORGE L. BUB.
ROGER Q. MOORE.